United States Patent
Kyrtsos et al.

(10) Patent No.: US 6,712,133 B1
(45) Date of Patent: Mar. 30, 2004

(54) SYSTEM AND METHOD FOR AUTOMATIC TEMPERATURE CONTROL IN VEHICLES USING PREDICTIVE CODING

(75) Inventors: Christos Kyrtsos, Southfield, MI (US); Kenneth Gerard Brown, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,014

(22) Filed: Mar. 12, 2002

(51) Int. Cl.⁷ ............................. F23N 5/20; G05D 23/00
(52) U.S. Cl. ..................................... 165/239; 236/91 C
(58) Field of Search ........................ 236/46 R, 91 C; 165/239

(56) References Cited

U.S. PATENT DOCUMENTS

| | | | |
|---|---|---|---|
| 3,591,077 A | 7/1971 | Alton et al. ................... 236/69 |
| 3,877,639 A | * 4/1975 | Wilson et al. ......... 237/12.3 C |
| 4,172,555 A | * 10/1979 | Levine ..................... 236/46 R |
| 4,325,426 A | 4/1982 | Otsuka et al. ............ 62/158 X |
| 4,390,959 A | * 6/1983 | Cabou ............... 236/436 R X |
| 4,436,064 A | * 3/1984 | Lamkewitz et al. .. 236/46 R X |
| 4,819,868 A | 4/1989 | Fornasari ..................... 236/495 |
| 4,899,930 A | 2/1990 | Kagohata et al. ......... 236/91 F |
| 5,025,984 A | * 6/1991 | Bird et al. ................ 236/46 R |
| 5,115,967 A | * 5/1992 | Wedekind ................. 236/91 R |
| 5,193,742 A | 3/1993 | Byun ....................... 236/49.3 |
| 5,516,041 A | 5/1996 | Davis, Jr. et al. .......... 236/49.3 |
| 5,549,152 A | 8/1996 | Davis, Jr. et al. ............ 165/201 |
| 5,553,776 A | 9/1996 | Davis, Jr. et al. .......... 236/49.3 |
| 5,570,838 A | 11/1996 | Davis, Jr. et al. ..... 236/91 C X |
| 5,579,994 A | 12/1996 | Davis, Jr. et al. .......... 236/49.3 |
| 5,679,073 A | 10/1997 | Hsieh et al. .................. 454/69 |
| 5,755,378 A | 5/1998 | Dage et al. ............... 236/91 C |
| 5,785,244 A | 7/1998 | McBroom ................. 318/51 X |
| 5,833,133 A | 11/1998 | Dage ........................... 236/13 |
| 5,937,940 A | 8/1999 | Davis, Jr. et al. ............ 165/202 |
| 5,988,517 A | 11/1999 | Bauer et al. ............... 236/49.3 |
| 6,173,902 B1 | 1/2001 | Bauer et al. ............... 236/49.3 |
| 6,186,885 B1 | 2/2001 | Ahn et al. ................... 454/127 |

* cited by examiner

*Primary Examiner*—William Wayner
(74) *Attorney, Agent, or Firm*—Brooks Kushman P.C.; Carlos Hanze

(57) ABSTRACT

A system and method for controlling temperature within a vehicle cabin include monitoring various temperature sensors to determine current operating conditions, determining a desired temperature or temperature range based on occupant input, dynamically estimating a temperature gradient based on changes in the current operating conditions over a predetermined time, predicting when the desired temperature or temperature range will be attained based on the gradient and the current operating conditions, and controlling a heating/cooling system based on the predicted time. Controlling the heating/cooling system may include shutting off the system at a predicted time, or turning on the system at a predicted time. The process of prediction can be linear, non-linear, or empirical, i.e., based on a table.

20 Claims, 3 Drawing Sheets

SYSTEM AND METHOD FOR AUTOMATIC TEMPERATURE CONTROL IN VEHICLES USING PREDICTIVE CODING

BACKGROUND OF INVENTION

1. Field of the Invention

The present invention relates to a system and method for automatically controlling temperature in a vehicle.

2. Background Art

Current automatic temperature control (ATC) units may operate more often than required to maintain the vehicle cabin temperature at a desired level, which may result in reduced fuel economy. These ATC units oscillate back and forth around a desired temperature or temperature range with the controller operating continuously to either cool or heat the vehicle cabin in an attempt to maintain the desired temperature.

SUMMARY OF INVENTION

A system and method for controlling temperature within a vehicle cabin include monitoring various temperature sensors to determine current operating conditions, determining a desired temperature or temperature range based on occupant input, dynamically estimating a temperature gradient based on changes in the current operating conditions over a predetermined time, predicting a time when the desired temperature or temperature range will be attained based on the gradient and the current operating conditions, and controlling a heating/cooling system based on the predicted time. Controlling the heating/cooling system may include shutting off the system at the predicted time, or turning on the system at the predicted time. The process of prediction may include linear, non-linear, or empirical methods.

The present invention includes a number of advantages. For example, the present invention uses a predictive controller that estimates when a desired temperature setting will be reached given current conditions and current momentum of the system. This information is used to shut down the heating/cooling system so that it does not run continuously and, therefore, may result in improved fuel economy. In addition, the present invention may be used to optimize current linear heating/cooling controllers.

The above advantages and other advantages and features of the present invention will be readily apparent from the following detailed description of the preferred embodiments when taken in connection with the accompanying drawings.

DETAILED DESCRIPTION

Figure 1:
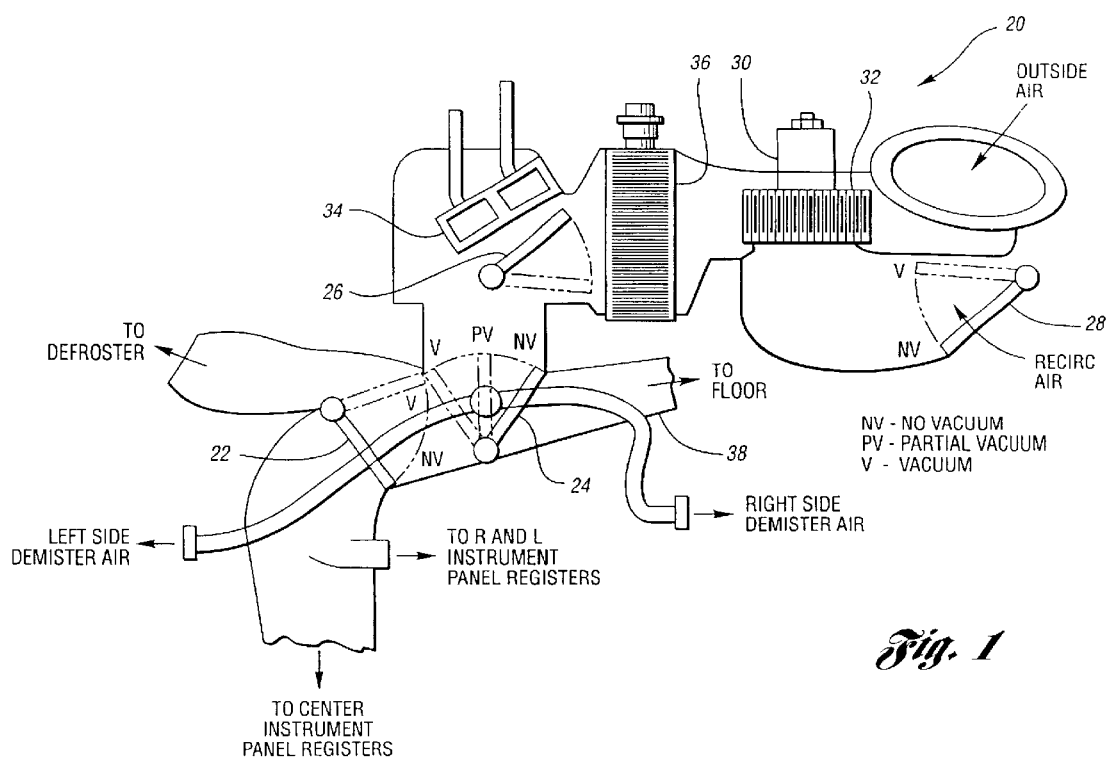
FIG. 1 is a block diagram illustrating a vehicle heating/cooling system with a predictive controller according to one embodiment of the present invention.

In general, automatic temperature control in a vehicle is accomplished using various actuators to adjust the temperature and flow of air supplied to the cabin of the vehicle. FIG. 1 illustrates a representative air handling system of an HVAC (heating, ventilation and air conditioning) system, indicated generally by reference numeral 20. System 20 includes various air actuators or doors 22, 24, 26, and 28 to provide air for panel-defrost, floor-panel, temperature blend and outside recirculation, respectively. Doors 22, 24 and 28 are driven by vacuum motors (not shown) between their various vacuum, partial vacuum and no vacuum positions, represented by "v", "pv", and "nv", respectively, in a conventional fashion. Door 26 is driven by an electric servo motor also in a conventional fashion.

System 20 may include a variable speed blower motor or fan 30 having a blower wheel 32. Heating and cooling elements, such as a heater core 34 and an evaporator core 36 in a typical vehicle air conditioning plant, are also provided. Each of the above components is in communication with ducting 38 to control temperature, direction of air flow, and the ratio of fresh air to recirculated air supplied to the vehicle cabin.

For automatic control of the temperature and flow of air in the cabin, conditions inside and outside the cabin are monitored by appropriate sensors. Preferably, an electronic controller generates signals to control the plant actuators based on the current operating conditions indicated by the sensors and a desired temperature or temperature range for the occupant(s) of the vehicle. The desired temperature or temperature range may be indicated via a user interface that may include analog, digital, and/or voice-activated controls. The desired temperature specified by the vehicle occupant(s) may be a specific value, i.e., 70° or a range, i.e., warm, hot, cool, etc. A temperature range may be converted by the user interface or system controller to a corresponding value that may vary depending upon the current operating conditions. For example, a temperature range of "cool" may initiate air conditioning when outside ambient temperature is above a corresponding threshold, but initiate heating with low blower speed when the outside ambient temperature is below a corresponding threshold. Stated differently, for some applications, the desired or "set" temperature or temperature range may be context-sensitive based on the current operating conditions.

Figure 2:
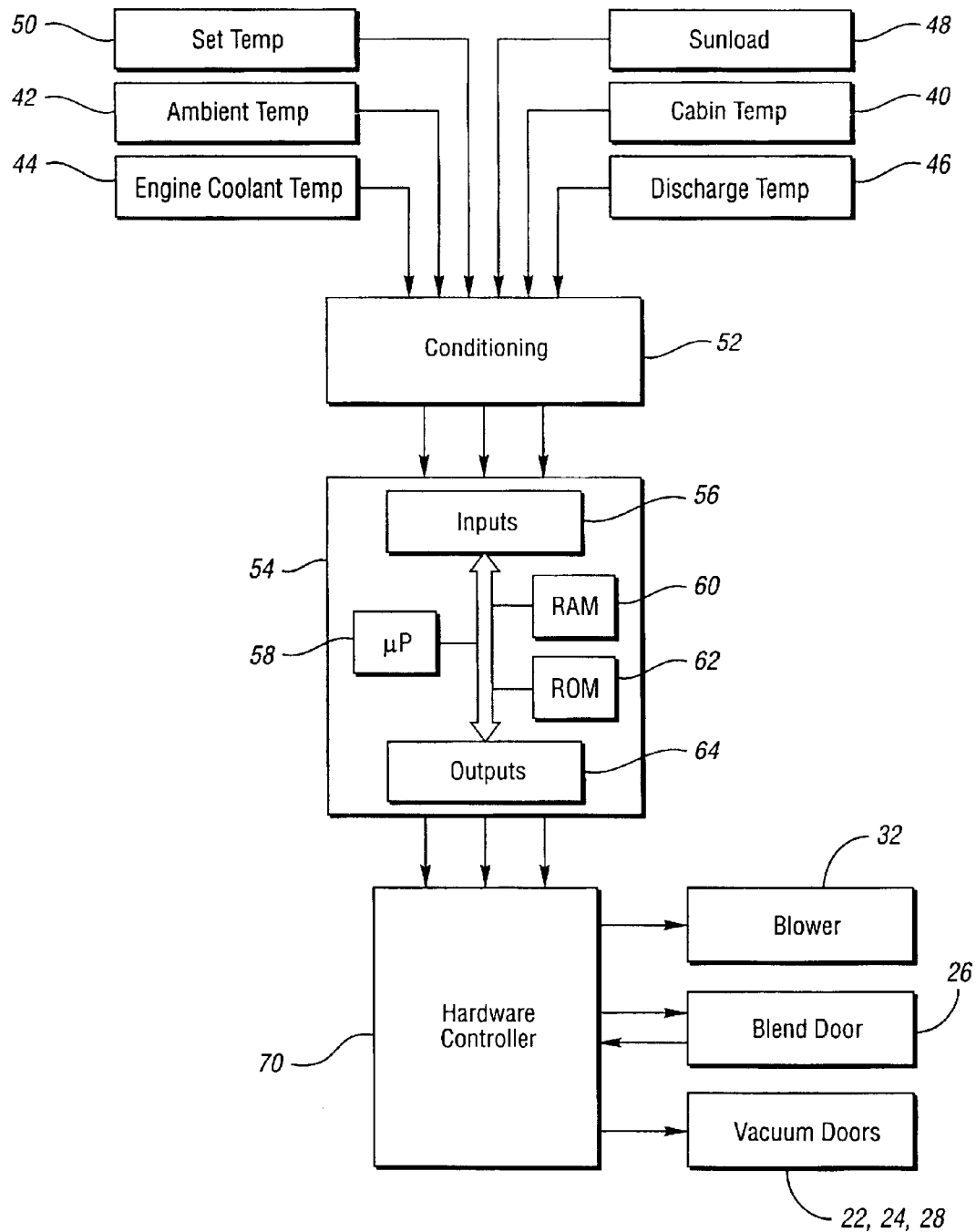
FIG. 2 is an alternative representation of a vehicle heat/cooling system with a predictive controller according to one embodiment of the present invention.

As illustrated in the block diagram of FIG. 2, a representative application includes various sensors for the heating/cooling system that provide signals representative of vehicle cabin temperature 40, ambient (outside) air temperature 42, engine coolant temperature (ECT) 44, discharge air temperature 46 and sun load 48, for example. In addition, an occupant interface allows the occupant to provide a desired temperature or temperature range 50 as described above. The sensor and interface signals are conditioned by associated conditioning circuitry 52 before being provided to an electronic controller 54 via inputs 56. Controller 54 preferably includes a microprocessor 58 in communication with one or more computer readable storage media represented by random access memory (RAM) 60 and read-only memory (ROM) 62. As will be appreciated by one of ordinary skill in the art, the computer-readable storage media may include various types of physical devices for temporary and/or persistent storage of data which include solid state, magnetic, optical, and combination devices. For example, the computer readable storage media may be implemented using one or more physical devices such as DRAM, PROMS, EPROMS, EEPROMS, flash memory, and the like. Depending upon the particular application, the computer-readable storage media may also include floppy disks, CD ROM, and the like. As explained in greater detail with reference to FIG. 3, controller 54 executes instructions stored in the computer readable media to process inputs 56 and generate outputs 64 for use by a hardware controller 44 which, in turn, controls doors 22–28 to regulate the temperature and flow of air to achieve the desired temperature or temperature range.

Figure 3:
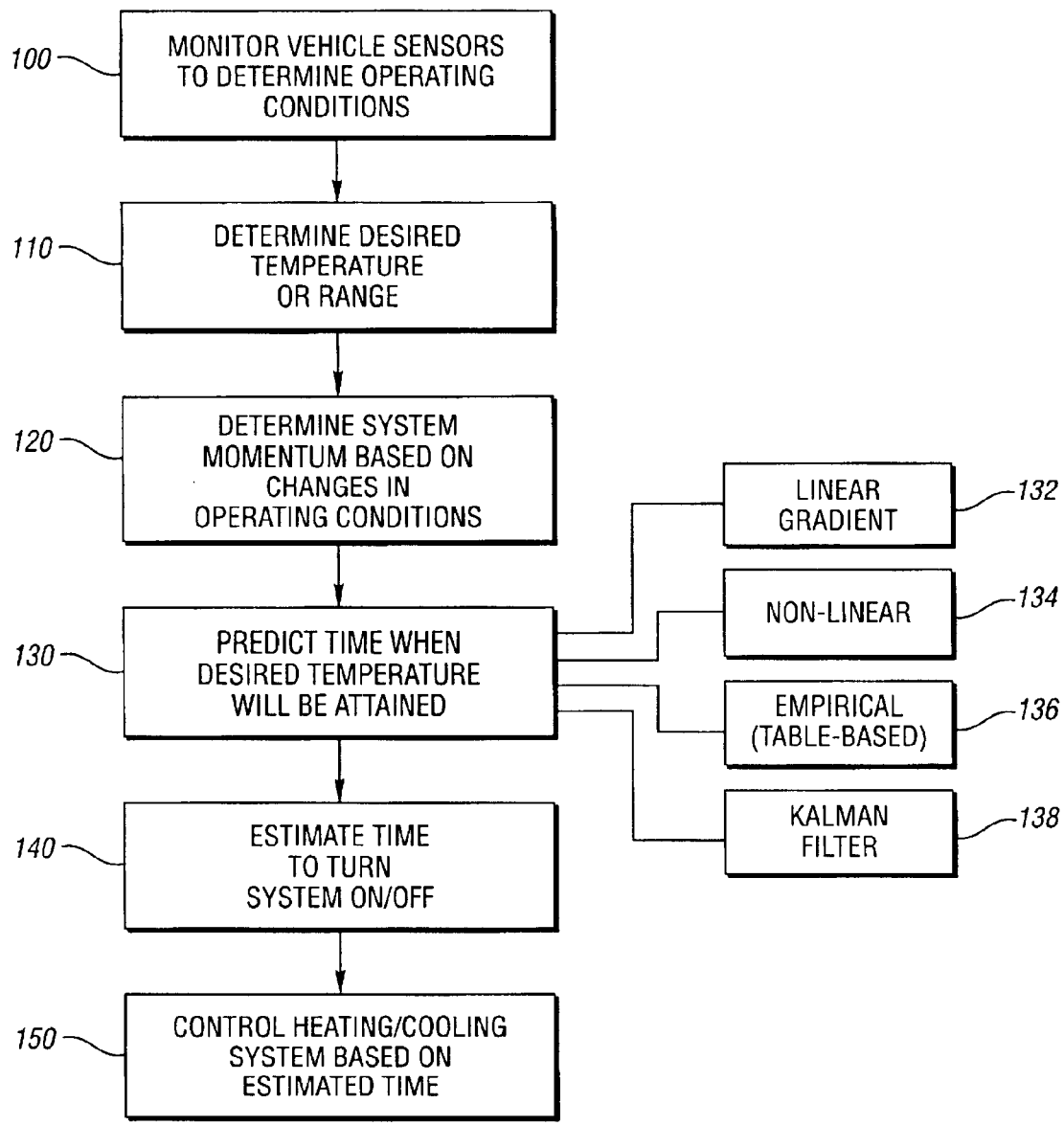
FIG. 3 is a flowchart illustrating operation of a system or method for controlling a vehicle heating/cooling system according to one embodiment of the present invention.

The diagram of FIG. 3 generally represents control logic for one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based controller. Of course, some or all of the control logic may be implemented in software, hardware, or a combination of software and hardware depending upon the particular application. When implemented in software, the control logic is preferably provided in a computer-readable storage medium having stored data representing instructions executed by a computer to control the heating/cooling of the vehicle cabin. The computer-readable storage medium or media may be any of a number of known physical devices which utilize electric, magnetic, and/or optical devices to temporarily or persistently store executable instructions and associated calibration information, operating variables, and the like.

As represented by block 100 of FIG. 3, various vehicle sensors are monitored to provide an indication of the current operating conditions. Sensor data is preferably periodically sampled and stored in a computer readable storage medium for future processing by the controller as described below. Signals from an occupant interface, which may include an analog, digital, or voice-activated interface, for example, are processed to determine a desired temperature or temperature range as represented by block 110. The desired temperature or temperature range is compared to one or more current temperatures as indicated by the vehicle sensors to determine a difference or error between the desired and actual temperature. In the case of a desired temperature range, the minimum, maximum, or average temperature may be used as the desired depending upon whether the system is currently operating and whether the system most recently was used for heating or cooling.

Using the stored sensor data, a system momentum or gradient is determined as represented by block 120. The system momentum or gradient provides an indication of how quickly the actual temperature is changing toward the desired temperature or temperature range. The system momentum or gradient is used in combination with the current operating conditions to predict when (time wise) the desired temperature will be attained as represented by block 130. The process of predicting when to start (and stop) the system may be lined as represented by block 132, non-linear as represented by block 134, or even empirically based, i.e., using one or more lookup tables stored in memory and indexed by the current temperature and/or system gradient as represented by block 136. Similarly, a Kalman filter could be used to predict the timing characteristics as represented by block 138. Those of ordinary skill in the art will recognize various other methods for predicting the start and stop time in accordance with the present invention.

An estimate of when the system (cooling or heating) should be turned off is determined based on the predicted time that the desired temperature will be attained as represented by block 140. These steps are preferably repeated until the desired temperature is attained, i.e., the error or difference between the actual and desired temperatures is near zero or below a corresponding threshold at which time the heating/cooling is controlled (turned off) as represented by block 150. Alternatively, the system may purposely overshoot the desired temperature (predicted time) by running (or remaining off) for a predetermined or adaptable time in addition to the time required to reach or maintain the desired temperature. This feature allows the system to remain off with the temperature staying within an acceptable error range. The particular environmental conditions as well as the desired set point and system momentum will influence the amount of time that the temperature will remain within a desired range with the system off. These factors are preferably considered when determining the amount of overshoot.

Once the heating/cooling source has been shut off, the current operating conditions continue to be monitored and the system momentum or gradient determined to predict when the heating/cooling system should be restarted based on how quickly the actual temperature is deviating from the desired value, i.e., based on the difference and the rate of change of the difference.

Thus, the present invention provides a predictive controller that predicts or estimates when a desired temperature setting will be reached given current conditions and current momentum of the system. This information is then used to shut down the heating/cooling system so that it does not run continuously and, therefore, may result in improved fuel economy. In addition, the present invention may be used to optimize current linear heating/cooling controllers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling temperature within a vehicle cabin, the method comprising:

monitoring vehicle sensors to determine current operating conditions;

determining a desired temperature based on input from a vehicle occupant;

determining system momentum based on changes in the current operating conditions over a period of time;

predicting a time when the desired temperature will be attained based on the system momentum and the current operating conditions; and controlling a heating/cooling system based on the predicted time.

2. The method of claim 1 wherein the step of monitoring vehicle sensors comprises monitoring signals indicative of outside ambient temperature, vehicle cabin temperature and engine coolant temperature.

3. The method of claim 1 wherein the step of predicting comprises predicting the time when the desired temperature will be attained based on a linear gradient.

4. The method of claim 1 wherein the step of controlling comprises shutting off the heating/cooling system.

5. The method of claim 1 wherein the step of controlling comprises turning on the heating/cooling system.

6. The method of claim 1 wherein the step of predicting comprises predicting the time when the desired temperature will be attained using a Kalman filter.

7. The method of claim 1 wherein the step of determining a desired temperature comprises determining a desired temperature based on input from the occupant and the current operating conditions.

8. The method of claim 1 wherein the step of determining a desired temperature comprises determining a minimum or maximum temperature associated with a temperature range selected by the occupant.

9. A computer readable storage medium having stored data representing instructions executable by a computer for controlling temperature within a vehicle cabin, the computer readable storage medium comprising:

instructions for monitoring vehicle sensors to determine current operating conditions;

instructions for determining a desired temperature based on input from a vehicle occupant;

instructions for determining system momentum based on changes in the current operating conditions over a period of time;

instructions for predicting a time when the desired temperature will be attained based on the system momentum and the current operating conditions; and instructions for controlling a heating/cooling system based on the predicted time.

10. The computer readable storage medium of claim 9 wherein the instructions for monitoring vehicle sensors comprise instructions for monitoring signals indicative of outside ambient temperature, vehicle cabin temperature and engine coolant temperature.

11. The computer readable storage medium of claim 9 wherein the instructions for predicting comprise instructions for predicting the time when the desired temperature will be attained based on a linear gradient.

12. The computer readable storage medium of claim 9 wherein the instructions for controlling comprise instructions for shutting off the heating/cooling system.

13. The computer readable storage medium of claim 9 wherein the instructions for controlling comprise instructions for turning on the heating/cooling system.

14. The computer readable storage medium of claim 9 wherein the instructions for predicting comprise instructions for predicting the time when the desired temperature will be attained using a Kalman filter.

15. The computer readable storage medium of claim 9 wherein the instructions for determining a desired temperature comprise instructions for determining a desired temperature based on input from the occupant and the current operating conditions.

16. The computer readable storage medium of claim 9 wherein the instructions for determining a desired temperature comprise instructions for determining a minimum or maximum temperature associated with a temperature range selected by the occupant.

17. A system for controlling temperature within a vehicle cabin, the system comprising:

a plurality of temperature sensors, the sensors providing signals indicative of current operating conditions;

means for heating the vehicle cabin;

means for cooling the vehicle cabin;

a user interface disposed within the vehicle cabin for providing a signal indicative of a desired temperature;

a controller in communication with the plurality of temperature sensors, the means for heating, the means for cooling, and the user interface, the controller determining a desired temperature based on the signal from the user interface, determining system momentum based on changes in the current operating conditions over a period of time, predicting a time when the desired temperature will be attained based on the system momentum and the current operating conditions, and generating signals to control the means for heating and the means for cooling based on the predicted time.

18. The system of claim 17 wherein the controller predicts the time when the desired temperature will be attained based on a linear gradient.

19. The system of claim 17 wherein the controller generates a signal to shut off the means for heating and the means for cooling system based on the predicted time.

20. The system of claim 17 wherein the controller determines a desired temperature by determining a minimum or maximum temperature associated with a temperature range selected by the occupant via the user interface.

* * * * *